United States Patent [19]
Marron et al.

[11] Patent Number: 5,613,163
[45] Date of Patent: Mar. 18, 1997

[54] METHOD AND SYSTEM FOR PREDEFINED SUSPENSION AND RESUMPTION CONTROL OVER I/O PROGRAMS

[75] Inventors: Assaf Marron, Ramat Gan, Israel; Allan S. Meritt, Poughkeepsie, N.Y.

[73] Assignee: International Business Machines Corporation, Armonk, N.Y.

[21] Appl. No.: 342,459

[22] Filed: Nov. 18, 1994

[51] Int. Cl.⁶ .................... G06F 3/00; G06F 3/04
[52] U.S. Cl. .................... 395/879; 395/821; 395/868; 395/826
[58] Field of Search ................ 395/821, 879, 395/868, 860, 823, 826, 852, 834, 737

[56] References Cited

U.S. PATENT DOCUMENTS

| | | | |
|---|---|---|---|
| 3,898,623 | 8/1975 | Cormier | 395/879 |
| 4,060,849 | 11/1977 | Bienvenu et al. | 364/200 |
| 4,228,504 | 10/1980 | Lewis et al. | 364/200 |
| 4,316,245 | 2/1982 | Luu et al. | 364/200 |
| 4,374,409 | 2/1983 | Bienvenu et al. | 364/200 |
| 4,374,415 | 2/1983 | Cormier et al. | 395/879 |
| 4,394,725 | 7/1983 | Bienvenu et al. | 364/200 |
| 4,403,282 | 9/1983 | Holberger et al. | 364/200 |
| 4,471,457 | 9/1984 | Videki, II | 364/900 |
| 4,635,191 | 1/1987 | Böning | 364/200 |
| 4,811,306 | 3/1989 | Böning et al. | 364/200 |
| 4,837,680 | 6/1989 | Crockett et al. | 364/200 |
| 4,868,742 | 9/1989 | Gant et al. | 395/852 |
| 4,996,639 | 2/1991 | Ishimoto et al. | 364/200 |
| 5,218,680 | 6/1993 | Farrell et al. | 395/325 |
| 5,367,639 | 11/1994 | Sodos | 395/879 |
| 5,394,527 | 2/1995 | Fakhruddin et al. | 395/879 |

OTHER PUBLICATIONS

Enterprise Systems Architecture/390 Principles of Operation, Publication No. SA22-7201-01 (IBM Corporation, Apr. 1993).

S.A. Calta, J.A. deVeer and A.S. Lett, "Post/Suspend-Resume", IBM Technical Disclosure Bulletin, vol. 23, No. 9, pp. 4228-4230 (Feb. 1981).

American National Standard for Information Systems, "Small Computer System Interface—2", pp. 67-70, pp. 321-340, pp. 365-368 (Oct. 17, 1991).

Enterprise Systems Architecture/390, "ESCON I/O Interface", Publication No. SA22-7202-02, IBM Corporation (Sep. 1992).

Primary Examiner—Jack B. Harvey
Assistant Examiner—Ario Etienne
Attorney, Agent, or Firm—Bernard M. Goldman; JoAnn K. Crockatt

[57] ABSTRACT

Execution of input/output operations is controlled by one or more suspend and/or resume mechanisms. Suspension of an input/output operation is accomplished by one of a number of mechanisms including, for instance, a START SUBCHANNEL instruction with execution limits, a SUSPEND SUBCHANNEL instruction with or without a suspension time limit, or a suspend subchannel channel command word with or without a suspension time limit. Subsequent to suspending execution of a channel program, execution can be resumed automatically or by issuing a RESUME SUBCHANNEL instruction with limits or a resume subchannel channel command word with limits.

16 Claims, 8 Drawing Sheets

FORMAT-0
86

FORMAT-1
86

METHOD AND SYSTEM FOR PREDEFINED SUSPENSION AND RESUMPTION CONTROL OVER I/O PROGRAMS

TECHNICAL FIELD

This invention relates in general to input/output operations executing within a data processing system, and in particular, to controlling execution of input/output operations by, for example, suspending execution of an input/output operation and optionally, resuming execution at a later time.

BACKGROUND ART

In data processing systems,.such as those defined in accordance with the Enterprise Systems Architecture/390 (ESA/390) offered by International Business Machines Corporation and similar architectures, an input/output operation is executed by decoding and executing one or more channel command words. Each channel command word is decoded and executed by a channel subsystem and an input/output device. One or more channel command words arranged for sequential execution form a channel program and are executed as one or more I/O operations, respectively. Execution of channel programs is controlled by, for instance, suspend and resume functions.

Currently, suspension of a channel program is initiated by the setting of a suspend control bit in a particular control block known as an operation request block. This information is then made available to the channel subsystem. The suspend function is signaled to the channel subsystem during channel program execution by specifying a suspend flag in one of the channel command words within the channel program. Suspension occurs when the channel subsystem fetches a channel command word with a valid suspend flag. The command in this channel command word is not sent to the input/output device, and the device is signaled that the chain of commands is concluded and the input/output operation is complete.

A subsequent RESUME SUBCHANNEL instruction informs the channel subsystem that the channel command word that caused suspension may have been modified and that the channel subsystem must refetch the channel command word and examine the current setting of the suspend flag. If the suspend flag is found not to be specified in the channel command word, the channel subsystem resumes execution of the chain of commands with the input/output device.

The ESA/390 suspend function described above provides for clean suspension of input/output operations only under the control of the same channel program. Thus, long running channel programs are less controllable by the operating system and in particular, the input/output supervisor located within the operating system. This forces the designer of the channel program to draw a balance between the risks of monopolizing the system's input/output resources and the efficiency gained from a long channel program. Further, the suspend function described above requires a previous determination of when the suspend is to occur. That is, the suspend bit must be turned on in the channel command word to be suspended. Additionally, the suspend and resume mechanisms described above do not provide for automatic suspension of a channel program a certain event occurs or for automatic resumption of the channel program after a certain amount of time. Yet further, the above-described suspend mechanism does not provide for issuance of a suspend function from a subchannel other than the one executing its own channel program.

In systems other than the Enterprise Systems Architecture/390, such as in the Small Computer Systems Interface (SCSI) I/O Architecture, I/O operations may be packaged into the equivalent of channel programs. In one example, commands are individual I/O requests passed on to the I/O subsystem. In another example, a single command operates on multiple data addresses, similar to data chaining in ESA/390, by using additional pointers. This is referred to as scatter/gather because of the ability of this function to use multiple distinct memory buffers in one I/O operation. In another example, linked SCSI commands which are similar to command chaining in ESA/390 Architecture is provided. As another example, a queue of I/O requests accumulates in a mailbox associated with the I/O device or with the channel I/O subsystem.

The SCSI Architecture is described in detail in Small Computer System Interface-2 (SCSI-2), IEEE X3T9 2/86 109, Oct. 17, 1991, which is incorporated herein by reference in its entirety. In the SCSI Architecture, there are a number of capabilities for stopping or suspending I/O operations. In one example, there is a Terminate I/O Process (TIPS) message. While the transfer is in progress between an initiator and a target, the initiator can send a MESSAGE to the target requesting "Terminate I/O Process." Upon receipt of this message, data transfer will cease, and the operation will be terminated gracefully with all byte counts being adjusted to reflect the correct state, as it was at the time of termination. Another capability includes a Target Transfer Disable (TTD) message. The TTD message is sent from an initiator to the target to request that subsequent reconnections for the data transfer on the I/O operation be done by the initiator, instead of the target. That is, as opposed to normal processing in which I/O devices and control units request reconnections to channels when disconnected, independent activity is complete, and the device/target is ready for the data transfer, TTD allows the initiator to choose the time when such data transfer will occur. In another example, a Continue I/O Process (CIP) message is provided. The CIP message is sent from an initiator to the target as a request to reconnect to an I/O process.

While the TIP, TTD and CIP messages provide for a means for requesting graceful but immediate termination of an I/O operation, or prevention of reconnection at certain times, they do not allow the initiator to request suspension in the middle of a transfer, in a manner that enables resumption. None of the SCSI messages offers a method in which the target can automatically reconnect after being disconnected (and suspended) for a duration specified by the initiator. None of the SCSI messages offers an interface between a control program and the initiator which allows structured program control over limits, suspensions and resumptions. In addition, TIP and TTD are immediate. They either terminate the current transfer (TIP) or prevent the very next and subsequent reconnections (TTD). TIP and TTD offer no means to allow a current operation, which includes transfer of data, to continue and then be suspended automatically when certain limits are reached.

Based on the foregoing, there still exists a need for control mechanisms which can suspend execution of I/O operations when a predefined limit is reached. Also, mechanisms for resuming execution are needed.

SUMMARY OF THE INVENTION

The shortcomings of the prior art are overcome and additional advantages are provided through the provision of various methods and systems for providing control within a data processing system. The data processing system has one or more central processing units, one or more input/output devices and a memory coupled to the one or more central processing units and one or more input/output devices.

In one embodiment, control is provided in the data processing system by executing one or more input/output operations within the data processing system, and suspending execution of the one or more input/output operations. Execution of the one or more input/output operations is suspended by executing a suspend operation, which executes independently of the one or more input/output operations.

In one example, the suspend operation is a suspend instruction controlled by one of the central processing units. In another example, the suspend operation is a command located in a second group of one or more input/output operations.

In one embodiment, a plurality of input/output operations is executed and execution of the plurality of input/output operations is suspended between one and another of the plurality of input/output operations. In a further example, execution of one of the one or more input/output operations is suspended before the one input/output operation completes executing.

In a further embodiment of the invention, control within the data processing system is provided by initiating execution of one or more input/output operations using an instruction controlled by a central processing unit of the data processing system. Execution of the one or more input/output operations is suspended using the instruction which initiated the execution.

In yet a further embodiment, control within the data processing system is provided by executing one or more input/output operations within the data processing system. Execution of the one or more input/output operations is suspended by processing a suspend command located within one of the input/output operations. Execution of the one or more input/output operations is suspended until a predefined suspension limit is satisfied. In a further embodiment, when the predefined suspension limit is satisfied, execution of the one or more input/output operations is automatically resumed.

In yet a further aspect of the invention, control is provided by initiating execution of one or more input/output operations using an instruction controlled by a central processing unit, using one or more execution limits to determine when execution is to be suspended, suspending execution using the instruction when execution is to be suspended, and automatically resuming execution when a predefined suspension limit is satisfied.

In another embodiment, control is provided by resuming execution of one or more input/output operations that has been suspended. During resuming, one or more predefined execution limits is referenced. When one or more of these limits is satisfied, execution of the one or more input/output operations is suspended.

Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

In accordance with the principles of the present invention, mechanisms are provided for controlling execution of input/output operations executing within a data processing system. In particular, mechanisms are provided for suspending and resuming execution of one or more input/output operations. In one example, input/output operations are included in a channel program and thus, mechanisms are provided for suspending and resuming execution of the channel program. The description herein focuses on ESA/390 and the description of channel programs. However, the mechanisms of the present invention pertain to any input/output operations, which can be suspended and/or resumed. The input/output operations need not be included in a channel program. For instance, the mechanisms of the present invention apply to SCSI I/O architecture, as well as others. These are therefore considered within the scope of the invention, as defined by the claims.

Figure 1:
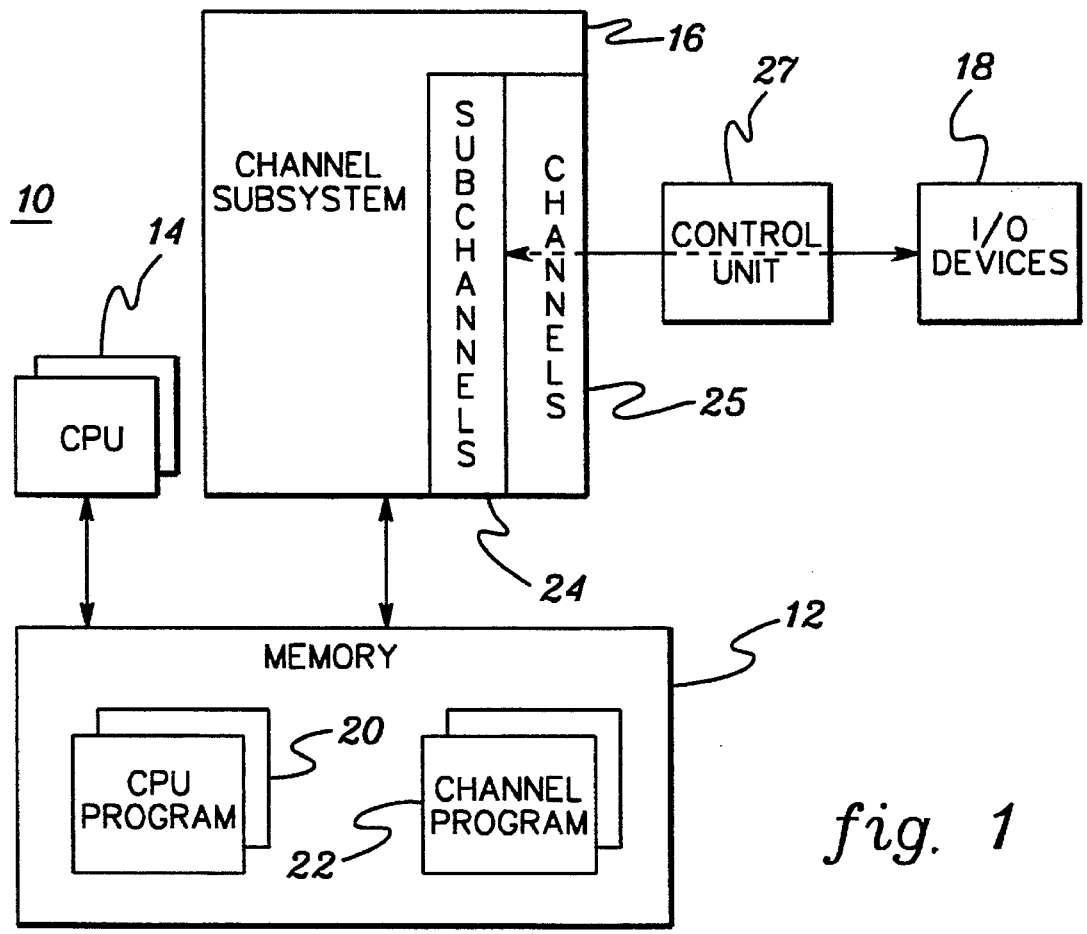
FIG. 1 depicts one example of a block diagram of a data processing system incorporating suspend and resume mechanisms used for providing control within the data processing system, in accordance with the principles of the present invention.

One embodiment of a data processing system incorporating the control mechanisms of the present invention is depicted in FIG. 1. Data processing system 10 is defined following, for example, the Enterprise Systems Architecture/390 (ESA/390) offered by International Business Machines Corporation. One embodiment of ESA/390 is described in detail in Enterprise Systems Architecture/390 Principles of Operation, Publication Number SA22-7201-01 (IBM Corporation, April 1993), which is hereby incorporated by reference in its entirety. In one example, data processing system 10 includes, for instance, a memory 12, one or more central processing units 14, a channel subsystem 16, one or more input/output (I/O) devices 18 and a control unit 27. Each of these components is described in detail below.

Memory 12 is a repository for programs and data loaded into the memory by one or more input devices. Memory 12 is directly addressable and provides for high-speed processing of data by central processing units (CPU) 14 and channel subsystem 16. In one embodiment, memory 12 includes one or more CPU programs 20 and one or more channel programs 22.

Programs 20 are executed by the central processing units and are comprised of CPU instructions. Some of the CPU instructions cause certain input/output activities to take place and are thus, called I/O instructions. Examples of I/O instructions include START SUBCHANNEL, RESUME SUBCHANNEL and, in accordance with the principles of the present invention, SUSPEND SUBCHANNEL.

Channel programs 22 are comprised of one or more channel command words (CCWs) and are executed by channel subsystem 16. A channel program in execution is often associated with at least one I/O operation on a given I/O device 18. Examples of channel commands include, for instance, read, write, transfer in channel, resume subchannel, and suspend. One embodiment of a resume subchannel CCW and a suspend subchannel CCW is described in detail in co-pending United States Patent Application entitled "System and Method for Coupling Channel Programs Without Host Processor Involvement" Ser. No 08/148,795, filed on Nov. 18, 1993 and assigned to International Business Machines Corporation (IBM Docket No. PO9-92-075), which is hereby incorporated by reference in its entirety.

Coupled to memory 12 are central processing units 14. As is known, central processing units 14 contain the sequencing and processing facilities for instruction execution, interruption action, timing functions, initial program loading and other machine-related functions. In particular, in one example, each central processing unit includes an input/output (I/O) supervisor for controlling execution of the I/O instructions.

Also coupled to memory 12 is channel subsystem 16 (or in another embodiment, an I/O system). The channel subsystem directs the flow of information between I/O devices 18 and memory 12. The channel subsystem relieves the CPUs of the task of communicating directly with the I/O devices and permits data processing to proceed concurrently with I/O processing. Located within or coupled to the channel subsystem are one or more subchannels 24 and one or more channels 25. A subchannel is a control block used by the channel subsystem to manage I/O devices and, in particular, manage the state and programs of the I/O devices. During an I/O operation, one subchannel is provided for and dedicated to each I/O device accessible to the channel subsystem. Each subchannel contains storage for information concerning the associated I/O device and its attachment to the channel subsystem. The subchannel also provides storage for information concerning I/O operations and other functions involving the associated I/O device. Information contained in the subchannel can be accessed by CPUs using I/O instructions as well as by the channel subsystem and serves as the means of communication between any CPU and the channel subsystem concerning the associated I/O device.

Figure 1A:
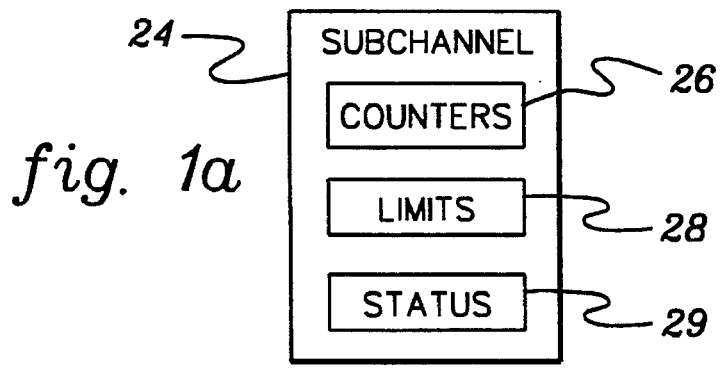
FIG. 1a depicts one embodiment of a subchannel located within the data processing system of FIG. 1, in accordance with the principles of the present invention.

In one particular example, in accordance with the principles of the present invention, a subchannel includes a plurality of counters 26, a plurality of limits 28, and a status field 29 (FIG. 1a) used for the present invention. As described below, limits 28 include a number of execution limits including, but not limited to, a–d below and a suspension limit e:

(a) A time limit indicating how long a channel program (or one or more I/O operations) is to run before suspending the channel program (or I/O operation(s));

(b) A CCW limit indicating the number of channel command words that are to be executed before suspending execution of the channel program;

(c) A byte limit indicating the number of bytes to be transferred between memory and the I/O device prior to suspending execution of the channel program (or I/O operation(s));

(d) A block limit indicating the number of physical data blocks to be transferred between memory and the I/O device before suspending execution of the channel program (or I/O operation(s)); and (e) A suspension time limit indicating how long the channel program (or I/O operation(s)) is to be suspended. Each of the limits is described in further detail below.

For each limit, there is a counter 26, which is updated by the channel subsystem during execution of the channel program or input/output operation(s). When the counter indicates that a particular limit is met, the appropriate action, such as suspension or resumption, takes place.

Additionally, in accordance with the principles of the present invention, status field 29 includes a control bit indicating whether or not the subchannel has been suspended. If the bit is on, the subchannel has been suspended. The bit may be reset (turned off) by a START SUBCHANNEL instruction or as a result of a MODIFY SUBCHANNEL instruction. Further, status field 29 includes another control bit indicating whether or not the subchannel has been suspended in the middle of the I/O operation. If the bit is on, suspension in the middle of the I/O operation occurred. The bit may be reset by the START SUBCHANNEL or MODIFY SUBCHANNEL instruction.

Referring once again to FIG. 1, coupled to subchannels 24 is one or more channels 25. Each channel can have multiple subchannels associated therewith. The channels provide the physical connection to the I/O devices through control unit 27.

Control unit 27 is coupled to channel subsystem 16 and I/O devices 18 and provides the logical capability necessary to operate and control one or more I/O devices and adapts, through the use of common facilities, the characteristics of each I/O device to the link interface provided by the channel.

In one embodiment, I/O devices 18 include printers, magnetic tape units, direct access storage devices (DASD), displays, keyboards, communications controllers, teleprocessing devices and sensor-based equipment, to name a few.

Associated with I/O devices are input/output operations. In one instance, input/output operations are initiated and controlled by CPU instructions and channel command words. One such CPU instruction is a START SUBCHANNEL instruction. When the START SUBCHANNEL instruction is executed, parameters are passed to the subchannel targeted by the instruction requesting that the channel subsystem perform a start function with the I/O device associated with the subchannel. The channel subsystem performs the start function by using information at the subchannel, including the information passed during execution of the START SUBCHANNEL instruction, to find an accessible channel path to the device. Once the device has been selected, execution of an I/O operation is accomplished by the decoding and executing of one or more channel command words (CCW) by the channel subsystem and the I/O device. One or more CCWs arranged for sequential execution form a channel program and are executed as one or more I/O operations, respectively.

As described above, channel programs are initiated by the START SUBCHANNEL instruction and are executed under control of the channel subsystem. At certain times, however, it is advantageous to suspend execution of a channel program. As one example, it is advantageous to suspend execution of a channel program when execution of the channel program is to be paced or slowed down. In this instance, as described in accordance with the principles of the present invention, execution is stopped for a certain predefined amount of time and then, it is started again. As a further example, it is advantageous to suspend execution of a channel program when system problems occur. Various suspend mechanisms, in accordance with the principles of the present invention, are described in detail below.

In one embodiment, the START SUBCHANNEL instruction is used, in accordance with the principles of the present invention, to suspend execution of a channel program. In particular, during execution of the channel program, the START SUBCHANNEL instruction references a number of execution limits to determine when suspension is to take place. When an execution limit is met, the channel program is suspended, in one example, at a CCW command boundary, and in another example, before a CCW command boundary is reached.

Figure 2:
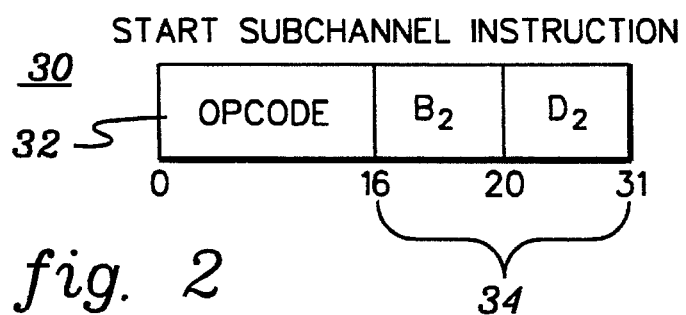
FIG. 2 depicts one embodiment of a START SUBCHANNEL instruction, in accordance with the principles of the present invention.

One example of a START SUBCHANNEL instruction used in suspending a channel program is described below with reference to FIG. 2. In one example, START SUBCHANNEL instruction 30 has an operation code (OPCODE) 32 designating that the operation to be performed is a start subchannel, and a second-operand address ($D_2(B_2)$) 34 identifying the logical address of an operation request block (ORB). As described in detail below, the operation request block contains execution parameters, including execution limits defined in accordance with the principles of the present invention, to be used in execution of the channel program. In addition to the above, the START SUBCHANNEL instruction uses the contents of general register 1 as an implied operand. In this instance, general register 1 contains the subsystem identification word (SID), which includes the subchannel number of the subchannel to be started.

When the START SUBCHANNEL instruction is initiated, channel subsystem 16 is signaled to asynchronously perform the start function for the associated device, and the execution parameters located in the operation request block are placed at the subchannel designated by general register 1. Further, execution of the channel program is initiated. During execution of the channel program, counters 26 (FIG. 1*a*) are updated and when one or more of the counters reach one or more of limits 28, execution of the channel program is suspended.

Figure 3:
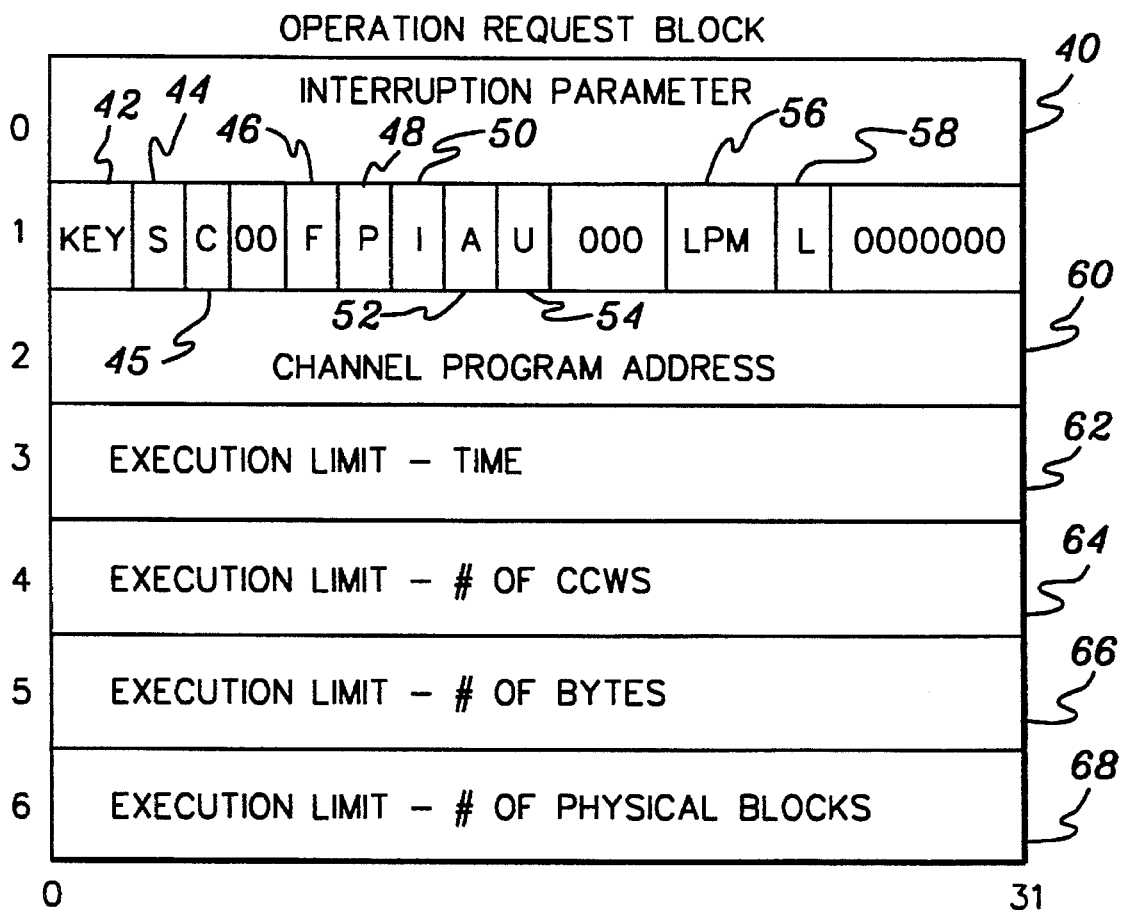
FIG. 3 depicts one example of an operation request block modified in accordance with the principles of the present invention.

One example of the execution limits used in accordance with the principles of the present invention is described below with reference to FIG. 3. As depicted in FIG. 3, pursuant to one embodiment of the present invention, a number of execution parameters, including the execution limits of the present invention, are located in an operation request block (ORB) 38. Some of the parameters are described in detail in Enterprise Systems Architecture/390 Principles of Operation, Publication Number SA22-7201-01 (IBM Corporation, April 1993), which is hereby incorporated by reference in its entirety, but are listed below for completeness. Other parameters, such as an immediate suspend control and the execution limits, are part of the invention and are described in detail below.

As one example, operation request block 38 includes, for example, the following parameters:

(a) Interruption Parameter (40): Bits 0–31 of word 0 are preserved unmodified in the subchannel until replaced by a subsequent START SUBCHANNEL or MODIFY SUBCHANNEL instruction.

(b) Subchannel Key (42): Bits 0–3 of word 1 form the subchannel key for all fetching of channel command words, indirect data address words and output data and for the storing of input data associated with the start function initiated by START SUBCHANNEL.

(c) Suspend Control (S) (44): In current operation, bit 4 of word 1 controls the performance of the suspend function for the channel program identified in the ORB. The setting of the S bit applies to all channel command words of the channel program designated by the ORB. When bit 4 is one, suspend control is specified, and channel program suspension occurs when a valid suspend flag is detected in a channel command word. If bit 4 is zero, suspend control is not specified, and the presence of the suspend flag in any channel command word of the channel program causes a program check condition to be recognized.

Suspend control 44 offers a different suspend mechanism from that of the present invention. Suspend control 44 can be used in conjunction with the suspend mechanism of the present invention. As described below, the suspend mechanism of the present invention uses a CPU instruction or a CCW to suspend execution of a channel program when one or more execution limits is met.

(d) An immediate suspend control (C) (45): In accordance with the principles of the present invention, immediate suspend control 45, bit 5 of word 1, determines if the requested suspension should occur immediately, or be deferred to the end of the current I/O operation. If the bit is off (e.g., set to zero), the requested suspension of the channel program (or I/O operation(s)) is deferred to the end of an I/O operation. That is, at a CCW boundary, if no data chaining exists, and at the end of the current data chained sequence of CCWs, if data chaining exists. If the bit is on (e.g., set to one), suspension can occur in the middle of the current I/O operation.

Figure 7A:
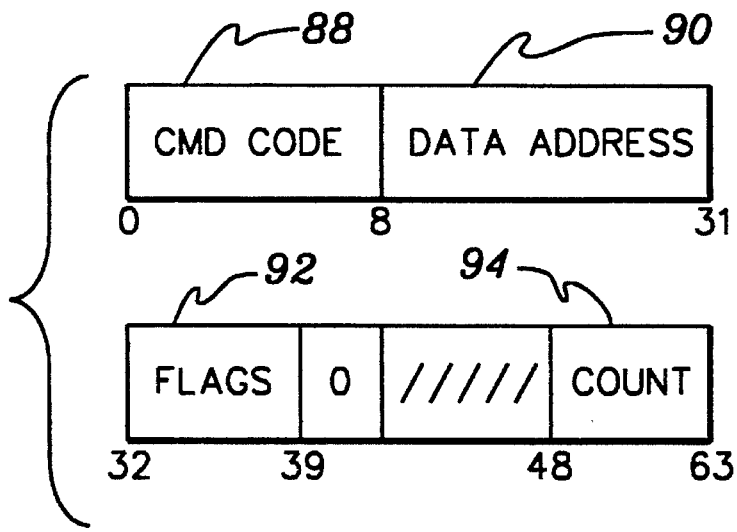
FIGS. 7a–7b illustrate examples of channel command words, in accordance with the principles of the present invention.
Figure 7B:
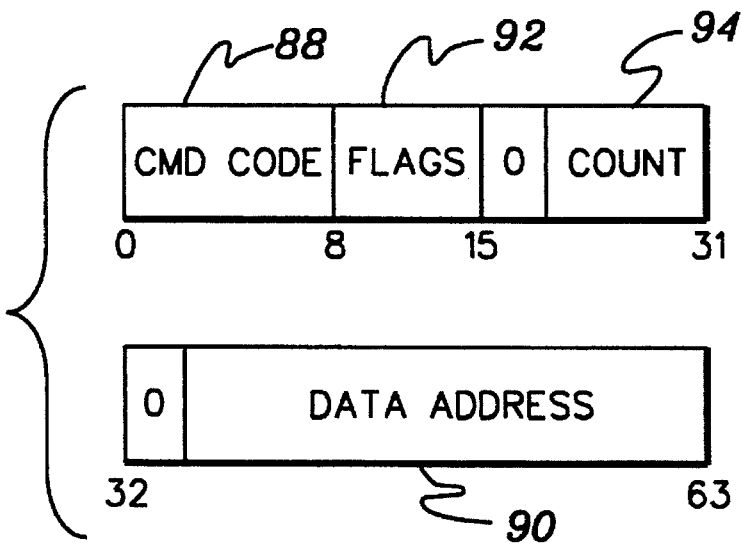

(e) Format Control (F) (46): Bit 8 of word 1 specifies the format of the channel command words which make up the channel program designated by the channel program address field. If bit 8 of word 1 is zero, format-0 channel command words are specified. If bit 8 is one, format-1 channel command words are specified. Format-0 and format-1 channel command words are described in further detail below with reference to FIGS. 7a and 7b.

(f) Prefetch Control (P) (48): Bit 9 of word 1 specifies whether or not unlimited prefetching of channel command words is allowed for the channel program. If this bit is zero, no prefetching is allowed, except in the case of data chaining on output, where the prefetching of one channel command word describing a data area is allowed. If this bit is one, unlimited prefetching is allowed.

(g) Initial Status Interruption Control (I) (50): Bit 10 of word 1 specifies whether or not the channel subsystem must verify to the channel program that the device has accepted the first command associated with a start or resume function.

(h) Address Limit Checking Control (A) (52): Bit 11 of word 1 specifies whether or not address limit checking is specified for the channel program. If this bit is zero, no address limit checking is performed for the execution of the channel program. If this bit is one, address checking is allowed for the channel program.

(i) Suppress Suspended Interruption Control (U) (54): Bit 12 of word 1, when one, specifies that the channel subsystem is to suppress the generation of an intermediate interruption condition due to suspension if the subchannel becomes suspended. When bit 12 is zero, the channel subsystem generates an intermediate interruption condition whenever the subchannel becomes suspended during execution of channel program.

(j) Logical Path Mask (LPM) (56): Bits 16–23 of word 1 are preserved unmodified in the subchannel and specify to the channel subsystem which of the logical paths 0-7 are to be considered logically available, as viewed by the program. A bit setting of one means that the corresponding channel path is logically available; a zero specifies that the corresponding channel path is logically not available. If a channel path is specified by the program as being logically not available, the channel subsystem does not use that channel path to perform clear, halt, resume or start functions when requested by the program, except when a dedicated allegiance condition exists for that channel path. If a dedicated-allegiance condition exists, the setting of the logical path mask is ignored, and a resume, start, halt or clear function is performed by using the channel path having the dedicated allegiance.

(k) Incorrect Length Suppression Mode (L) (58): When the incorrect length indication suppression facility is installed and format control 46 is one, then this bit, when one specifies the incorrect length suppression mode. If the subchannel is in this mode when an immediate operation (that is, a device signals the channel end condition during initiation of the command) occurs and the current CCW contains a non-zero value in bits 16–31, indication of an incorrect length condition is suppressed.

When the incorrect length indication suppression facility is installed and the format control is one, then this bit, when zero, specifies the incorrect length indication mode. If the subchannel is in this mode when an immediate operation occurs, and the current CCW contains a non-zero value in bits 16–31, indication of an incorrect length condition is recognized. Command chaining is suppressed unless the SLI flag in the CCW is one and the chain data flag is zero.

When the incorrect length indication suppression facility is installed and the format control is zero, the value of this bit is ignored by the channel subsystem, and the subchannel is in the incorrect length suppression mode.

When the incorrect length indication suppression facility is not installed and format control 46 is zero, the subchannel is in the incorrect length suppression mode. When the incorrect length indication suppression facility is not installed, this bit must be zero; otherwise an operand exception is recognized.

(1) Channel Program Address (60): Bits 0–31 of word 2 designate the location of the first channel command word in absolute storage. Bit 0 of word 2 must be zero; otherwise an operand exception or a program check condition is recognized. If format-0 CCWs have been specified by the format control, then bits 1–7 must also be zeros; otherwise, a program check condition is recognized.

The three rightmost bits of the channel program address must be zeros, designating the channel command word on a double word boundary; otherwise a program check condition is recognized.

(m) Execution Limit—Time (62): In accordance with the principles of the present invention, bits 0–31 of word 3, or a portion thereof, indicate an amount of an execution time limit. That is, when the channel program has been executing for the amount of time specified by this parameter, the channel program is suspended. In one example, the time parameter refers to seconds. In other examples, milliseconds or other time units may be used.

(n) Execution Limit—Number of CCWs (64): In accordance with the principles of the present invention, bits 0–31 of word 4, or a portion thereof, indicate the number of channel command words that are to be executed before suspending execution of the channel program.

(o) Execution Limit—Number of Bytes (66): In accordance with the principles of the present invention, bits 0–31 of word 5, or a portion thereof, indicate the number of bytes to be transferred between memory and the I/O device prior to suspending execution of the channel program.

(p) Execution Limit—Number of Physical Blocks (68): In accordance with the principles of the present invention, bits 0–31 of word 6, or a portion thereof, indicate the number of physical data blocks to be transferred between memory and the I/O device before suspending execution of the channel program.

Described above are a number of execution limits stored in an ORB and referenced by a START SUBCHANNEL instruction for the purpose of suspending execution of the channel program previously initiated by the START SUBCHANNEL instruction. One of ordinary skill in the art will recognize that other limits or parameters may be specified without departing from the spirit of the invention. Therefore, these parameters or limits are considered a part of the invention. It will also be apparent to one of ordinary skill in the art that control blocks other than the ORB can designate execution parameters, including limits.

In one embodiment, the channel program is stopped at a CCW command boundary, most likely at the first CCW command boundary after a limit was exceeded, or after a suspend request was received. Ad hoc decisions by the implementation can vary where the actual suspension occurs. For instance, a channel program can be suspended prior to reaching a command boundary, such as, for example, during data chaining. Immediate control bit 45 indicates to the channel when suspension is to occur, as described above.

Figure 4:
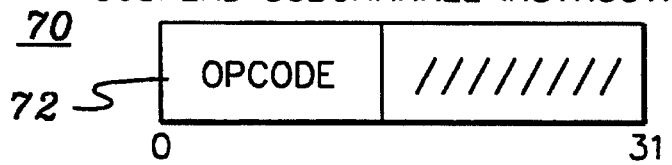
FIG. 4 depicts one embodiment of a SUSPEND SUBCHANNEL instruction, in accordance with the principles of the present invention.

In addition to the START SUBCHANNEL instruction described above, other mechanisms are provided in accordance with the principles of the present invention for suspending execution of a channel program or input/output operations running in a data processing system. As one example, a suspend operation, namely a new central processing unit instruction, referred to as a SUSPEND SUBCHANNEL instruction, is provided. The SUSPEND SUBCHANNEL instruction can be issued by the I/O supervisor when the I/O supervisor determines that an application is monopolizing the system resources or if, for instance, there is a problem with the system. One example of the SUSPEND SUBCHANNEL instruction is depicted in FIG. 4.

In one embodiment, a SUSPEND SUBCHANNEL instruction 70 includes an operation code (OPCODE) 72 specifying that suspension of the channel program is to take place. Additionally, the SUSPEND SUBCHANNEL instruction uses general register 1, which designates the subsystem identification word identifying the subchannel to be suspended.

Figure 5:
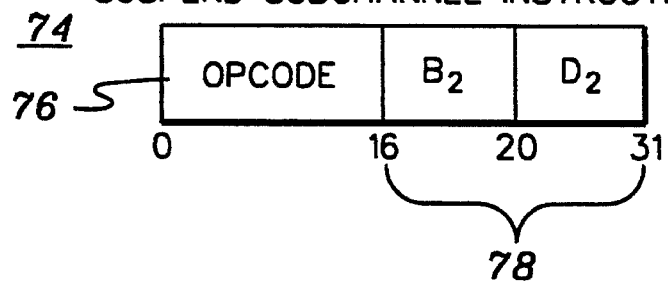
FIG. 5 depicts another embodiment of a SUSPEND SUBCHANNEL instruction, in accordance with the principles of the present invention.

In another embodiment, a SUSPEND SUBCHANNEL instruction may have the format depicted in FIG. 5. This format allows the SUSPEND SUBCHANNEL instruction to reference the operation request block, and in particular any execution parameters provided in the operation request block, in accordance with the principles of the present invention. As illustrated in FIG. 5, in one embodiment, SUSPEND SUBCHANNEL 74 includes an operation code (OPCODE) 76 and a second-operand address ($D_2(B_2)$) 78 designating the logical address of an operation request block. Further, SUSPEND SUBCHANNEL instruction 74 uses general register 1 to identify the subchannel to be suspended.

Figure 6:
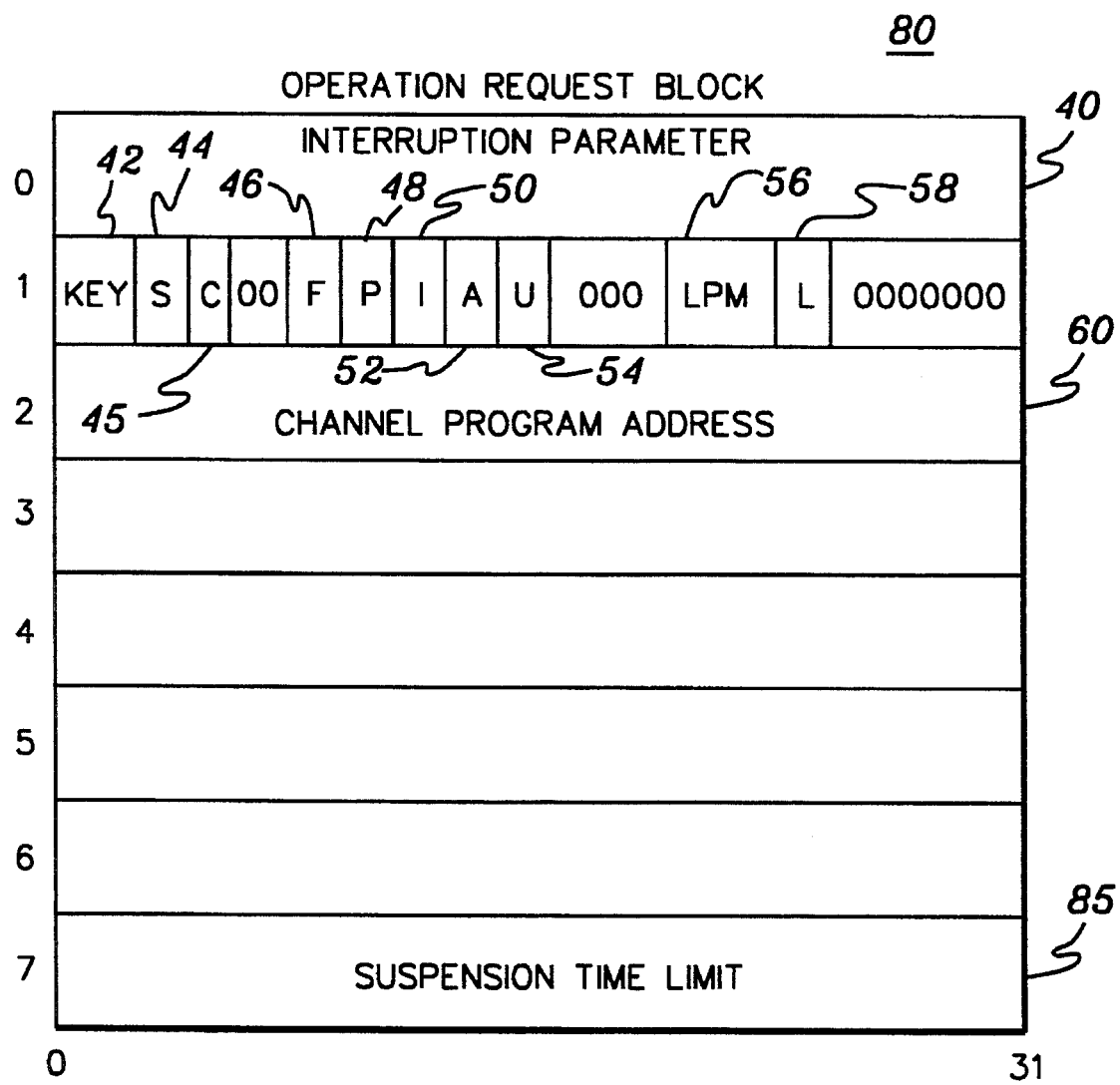
FIG. 6 depicts another example of an operation request block modified in accordance with the principles of the present invention.

One embodiment of an operation request block 80 referenced by SUSPEND SUBCHANNEL instruction 74 is depicted in FIG. 6. In this example, words 0–2 contain the same information as described above with reference to FIG. 3, and thus are not explained in detail here. (Like numbers indicate similar parameters.) Additionally, words 3–6 of the ORB are unused and a suspension time limit 85 is stored in bits 0–31, or a portion thereof, of word 7. The suspension time limit indicates that the channel program is to be suspended for the amount of time designated by the suspension time limit. Thereafter, it is automatically awoken by the channel subsystem. In other embodiments, other limits, such as, for example, execution limits or other suspension limits, may also be specified. Each additional limit would be placed in one or more words of the operation request block, as described above.

As described above, the SUSPEND SUBCHANNEL instructions can be issued whenever the central processing unit and, in particular, the I/O supervisor, determines suspension is to occur. The SUSPEND SUBCHANNEL instructions are independent of the channel program or I/O operation to be suspended. As used herein, independent of the channel program or I/O operation means, for instance, that the channel program or I/O operation does not have to be aware of or coded for a subsequent suspension; the instruction does not have to know where in memory the channel program or I/O operation is; memory occupied by the channel program or I/O operation does not have to be modified to perform the suspension; and further, there is full functionality of other suspend mechanisms already present.

In addition to the central processing unit instructions for suspending execution of a channel program or input/output operation(s) described above, other suspend operations, such as, for example, channel command words executing on one subchannel may also be used for suspending execution of channel programs executing on other subchannels, in accordance with the principles of the present invention. Channel command words suspend execution of a channel program without intervention from the central processing unit (i.e., independent of the central processing unit). These channel command words are also independent of the channel program or I/O operation to be suspended, as described above.

One example of a suspend subchannel channel command word used in suspension of a subchannel executing a current channel program is described in detail in co-pending United States Patent Application entitled "System and Method for Coupling Channel Programs Without Host Processor Involvement" Ser. No. 08/148,795, filed on Nov. 8, 1993 and assigned to International Business Machines Corporation, which is hereby incorporated by reference in its entirety, as noted above. However, the channel command word described therein can suspend only its own execution of a channel program and cannot suspend execution of other channel programs on other subchannels. The channel command word described herein, in accordance with the principles of the present invention, however, is capable of suspending channel programs running on other subchannels. (This is referred to as "suspend another CCW".) In particular, a channel command word running on one subchannel can suspend execution of a channel program running on another subchannel.

As is known, channel command words may have, for instance, two formats—Format-0 and Format-1. Thus, both formats relating to the suspension mechanism of the present invention are described below with reference to FIGS. 7a and 7b, respectively. Each format contains the same fields, however, the fields are in different positions depending on the format. Many of the fields described below are described in detail in Enterprise Systems Architecture/390 Principles of Operation, Publication Number SA22-7201-01 (IBM Corporation, April 1993), which is hereby incorporated by reference in its entirety, but are included herein for completeness. The differences in the fields relating to the present invention are also noted below.

In one example, each channel command word 86 includes the following fields:

(a) Command Code (CMD code) 88: Bits 0–7 (both formats) specify the operation to be executed. In this instance, the operation to be executed is a suspend subchannel operation.

(b) Data Address 90: Bits 8–31 (format-0) or bits 33–63 (format-1) designate a location in absolute storage. It is the first location referred to in the area designated by the CCW. If a byte count of zero is specified, this field is not checked.

In accordance with the principles of the present invention, in one embodiment, the data address field points to a control block containing execution and/or suspension limits used in suspending the subchannel.

(c) Flags 92: Bits 32–38 (format-0) or bits 8–14 (format-1) designate a number of flags used in the operation of channel command words. Each of these flags is described below:

(1) Chain-Data (CD) Flag: Bit 32 (format-0) or bit 8 (format-1), when one, specifies chaining of data. It causes the storage area designated by the next CCW to be used with the current I/O operation. When the CD flag is one in a CCW, the chain-command and suppress-length-indication flags, described below, are ignored.

(2) Chain-command (CC) Flag: Bit 33 (format-0) or bit 9 (format-1), when one, and when the CD flag and S flag are both zeros, specifies chaining of commands. It causes the operation specified by the command code in the next CCW to be initiated on normal completion of the current operation.

(3) Suppress-Length-Indication (SLI) Flag: Bit 34 (format-0) or bit 10 (format-1) controls whether an incorrect-length condition is to be indicated to the program. When this bit is one and the CD flag is zero, the incorrect-length indication is suppressed. When both the CC and SLI flags are ones, and the CD flag is zero, command chaining takes place, regardless of the presence of an incorrect-length condition. This bit should be specified in all CCWs where suppression of the incorrect-length indication is desired.

(4) Skip (SKIP) Flag: Bit 35 (format-0) or bit 11 (format-1), when one, specifies the suppression of transfer of information to storage during a number of input/output instructions, such as read, read-backward, sense ID, or sense operation. Each of these input/output instructions is known in the art.

(5) Program-Controlled-Interruption (PCI) Flag: Bit 36 (format-0) or bit 12 (format-1), when one, causes the channel subsystem to generate an intermediate interruption condition when the CCW takes control of the I/O operation. When the PCI flag bit is zero, normal operation takes place.

(6) Indirect-Data-Address (IDA) Flag: Bit 37 (format-0) or bit 13 (format-1), when one, specifies indirect data addressing.

(7) Suspend (S) Flag: Bit 38 (format-0) or bit 14 (format-1), when one, specifies suspension of channel program execution. When valid, it causes channel program execution to be suspended prior to execution of the CCW containing the S flag. The S flag is valid when bit 4, word 1, of the associated ORB is one.

This bit is used in current suspend mechanisms, as described above. It is not necessary for implementation of suspending another subchannel, in accordance with the principles of the present invention.

(d) Count 94: Bits 48–63 (format-0) or bits 16–31 (format-1) specify the number of bytes in the storage area designated by the CCW.

As described above, data address 90 is used, in one example, to reference a control block, which indicates the subchannel to be suspended by the suspend another CCW. Additionally, the control block can indicate any desired limits to be used in suspending execution of the targeted subchannel. One example of such a control block is an operation request block 95 depicted in FIG. 8.

Figure 8:
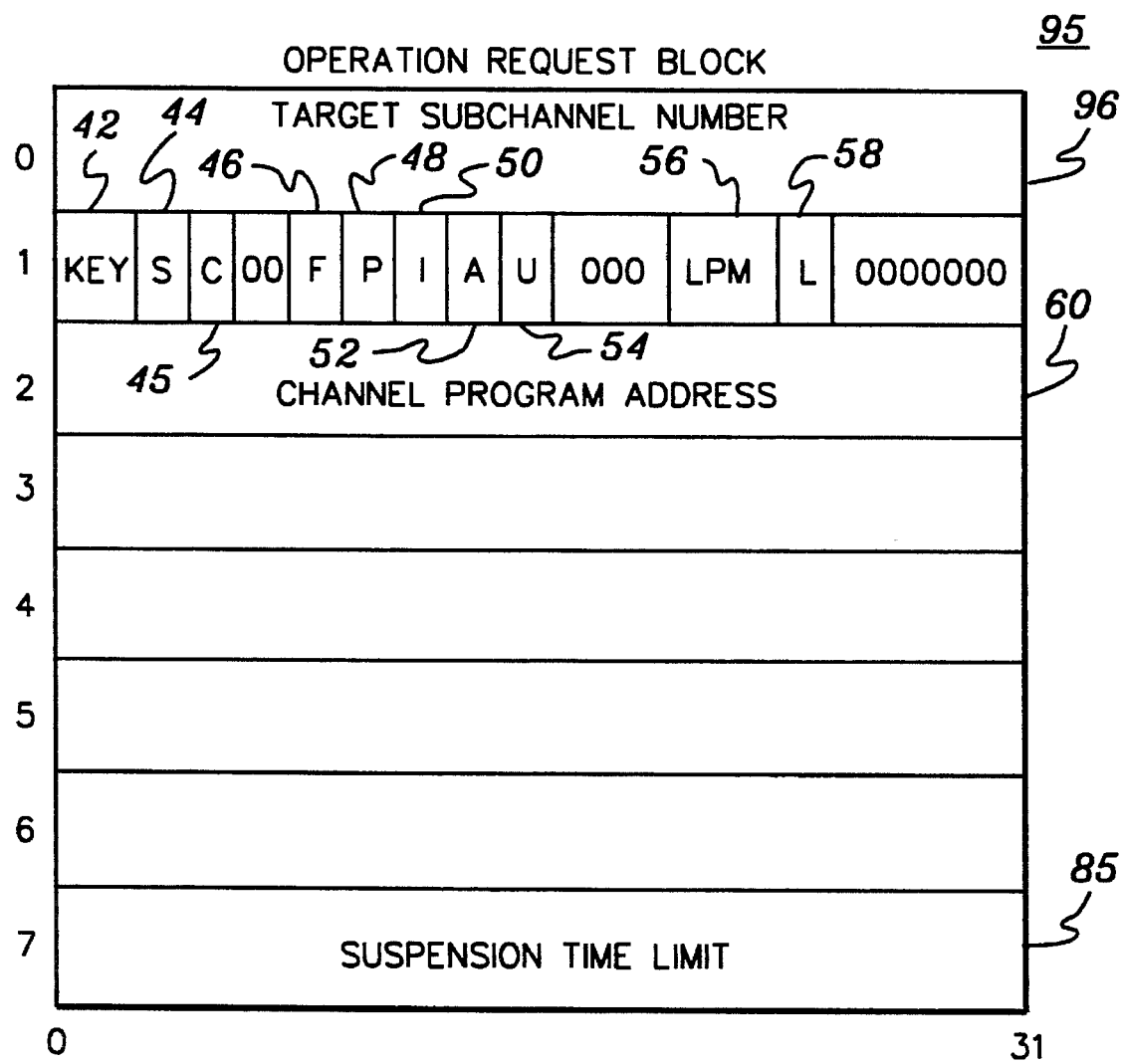
FIG. 8 depicts another example of an operation request block modified in accordance with the principles of the present invention.

Referring to FIG. 8, operation request block 95 contains, for example, a target subchannel number 96 located in word 0 of ORB 95. The target subchannel number indicates the subchannel to be suspended. Additionally, words 1 and 2 of operation request block 95 include the same parameters as described with reference to words 1 and 2 of ORB 80 depicted in FIG. 6. In this embodiment, words 3–6 are unused and word 7 includes suspension time limit 85, designating that a suspension is to occur for a predetermined amount of time. It will be apparent to those skilled in the art that any other limits may be used and placed in the ORB in a manner described above.

The channel command word described above is for suspending execution of a subchannel, which is not executing the channel command word performing the suspension. Described below are other embodiments of channel command words used in suspending a channel program.

In accordance with the principles of the present invention, in another embodiment, a suspend subchannel channel command word with limits is used to suspend its currently executing channel program for a predefined amount of time. In particular, one or more suspend subchannel channel command words are imbedded in the currently executing channel program, and when each suspend CCW is reached, execution of the channel program is suspended for the predefined amount of time. Thereafter, the channel program is automatically resumed by the channel subsystem. (Should a resume be issued by another party before the automatic wake up, the impending wake up is canceled.) This is advantageous when the channel program wants to slow itself down or coordinate with other channel programs using timing instead of events.

In one embodiment, any limits to be used by the suspend CCW are stored in a control block, such as operation request block 95 (FIG. 8) described above. It is not necessary to use an operation request block. However, in one embodiment, the ORB is used to maintain consistency among the embodiments. Operation request block 95 is described above, and therefore, is not described at this point.

In one example, operation request block 95 is identified by the channel program by placing a pointer to the operation request block in, for example, the data address field of the channel command word. In other embodiments, it is possible to place the pointer to the ORB, or the contents of the ORB, in other fields of the CCW.

Described above are various embodiments of SUSPEND SUBCHANNEL instructions and suspend subchannel channel command words used for suspending execution of a channel program or one or more input/output operations. When a SUSPEND SUBCHANNEL instruction or a suspend subchannel CCW is processed at the channel subsystem, the appropriate channel (FIG. 1) communicates the suspension request to control unit 27, in the manner described herein. (It will be apparent to one of ordinary skill in the art that a mechanism similar to the below described mechanism can be used to communicate a suspension initiated from the START SUBCHANNEL instruction.

In particular, when immediate suspend control 45 of the operation request block is off, the channel uses known techniques to communicate the suspension request from the channel to the control unit. Specifically, the channel indicates the end of the channel program by using, for instance, packets, which are described in Enterprise Systems Architecture/390 ESCON I/O Interface, Publication No. SA22-7202-02, (International Business Machines Corporation, September 1992), which is hereby incorporated herein by reference in its entirety. In another example, the channel communicates the end of the channel program by using electrical signalling as described in, for instance, Cormier, U.S. Pat. No. 3,898,623 entitled "Suspension and Restart of Input/Output Operations" assigned to International Business Machines Corporation, and issued on Aug. 5, 1975, which is incorporated herein by reference in its entirety.

Figure 9:
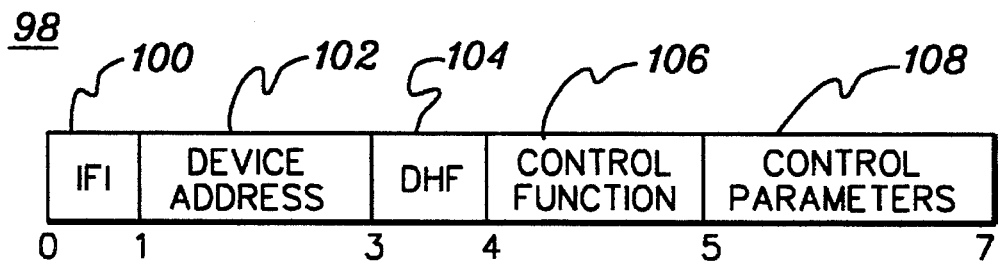
FIG. 9 depicts one embodiment of a device-level control frame, in accordance with the principles of the present invention.

When immediate suspend control 45 is on indicating that the channel program (or I/O operation) is to be suspended immediately even if it is before a CCW command boundary, the request is communicated from the channel to the control unit in the manner described herein. Specifically, in accordance with the principles of the present invention, the channel sends a suspend immediate request device-level control frame to the control unit. One example of a device-level control frame 98 is depicted in FIG. 9. Since device-level control frames are described in detail in Chapter 6 of Enterprise Systems Architecture/390 ESCON I/O Interface, Publication No. SA22-7202-02, (International Business Machines Corporation, September 1992), which is hereby incorporated by reference in its entirety, they are not discussed in detail herein. Instead, a brief description of the fields is provided and any information particularly pertinent to the present invention is described in detail.

Referring to FIG. 9, device-level control frame includes, for example, the following fields:

An information-field identifier (IFI) 100, which indicates the device frame type and the functions that affect field format or interpretation;

A device address 102, which identifies the I/O device on the logical path that is to receive the contents of the information field in channel-to-control-unit frames or that is to send the contents of the information field in control-unit-to-channel frames;

A device-header flag field (DHF) 104, which invokes certain device-level protocols to control the execution of an I/O operation;

A control function 106, which is interpreted in conjunction with the bits in the device-header flag field to determine the device-level function to be performed and the format of the control parameter field. In accordance with the principles of the present invention, the control-function function field is set to '11000'B to indicate a suspend immediate request; and A control parameters field 108, which specifies any parameters associated with the control function. In accordance with the principles of the present invention, the control parameters field is set to all zeroes.

When the control unit receives the device-level control frame, it determines, by known techniques whether it can suspend the operation. If the control unit can suspend the operation, it retains all the information necessary to continue the operation when the channel subsequently resumes it. In particular, it preserves the command code from the channel command word or the opcode from the instruction, logical positioning and orientation of the device, and cache or buffer pointers, as appropriate. The control unit also preserves the number of bytes transferred to or received from the channel for the current CCW. The control unit then returns a status frame to the channel.

Figure 10:
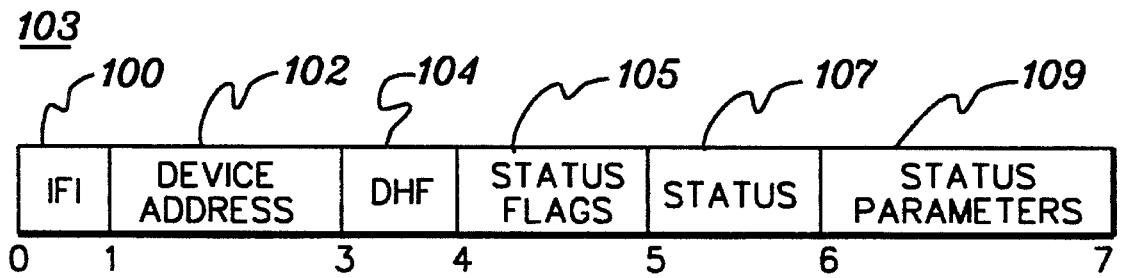
FIG. 10 depicts one example of a status frame, in accordance with the principles of the present invention.

One embodiment of a status frame 103 is depicted in FIG. 10. As with the device-level control frame, the status frame is described in detail in Chapter 6 of International Business Machines Corporation's Enterprise Systems Architecture/ 390 ESCON I/O Interface, Publication No. SA22-7202-02, published September 1992, which is hereby incorporated by reference in its entirety, as noted above. Therefore, the fields are generally described below and any enhancements for the present invention are described in detail. In one example, status frame 103 includes the following fields:

Information-field identifier 100, device address 102 and device-header flag field 104, each of which is described above. In the device header flag field of the status frame, an end block (EB) bit, bit 1, is set to one to notify the channel of a disconnection;

A status flag field 105, which is used to provide additional information to the channel concerning the conditions that were present in the control unit when status was generated and conditions that pertain to the status frame. Status flag field 105 includes the following flags:

A flag-field code (FFC): The FFC, bits 0–2, is a three bit encoded field that either in conjunction with or independent of the other status flag bits further describes the status information contained in the status byte or the status parameter field, or both. In accordance with the principles of the present invention, the flag field code is set to '001'B, indicating that the operation has been suspended;

A channel initiated flag (CI): The CI bit, bit 3, when set to one, indicates that the status frame resulted from the identified I/O device having accepted a selective-reset frame, with either a request for retry or a request for unit check. In accordance with the principles of the present invention, the CI bit is set to one, indicating the status frame resulted from a channel-initiated function;

A supplemental status available flag (SA): The SA bit, bit 4, may optionally be used by the control unit to indicate that supplemental status associated with the current status frame is available;

A command retry bit (CR): The CR bit, bit 5, when set to one, is used to request command retry if the status byte also contains retry status;

A long record bit (LR): The LR bit, bit 6, when set to one, indicates that a long-record condition was detected by the control unit; and A transfer-count valid bit (XV): The XV bit, bit 7, when set to one, indicates that the status parameter field contains the transfer count; that is, the total number of bytes sent or received by the control unit for the current CCW. The XV bit may be set to one by the control unit only when the channel-end status bit is set to one or when an operation is suspended, as indicated by the flag-field code set to '001'B. In accordance with the principles of the present invention, the XV flag is set to one indicating that the status parameter field contains a valid transfer count.

A status byte field 107, which indicates device and control unit status. In accordance with the principles of the present invention, the status byte contains '00'X.

A status parameter field 109 may contain a transfer count, if specified by the XV bit. The transfer count is the total number of bytes sent or received by the control unit for the current CCW.

In accordance with the principles of the present invention, the above-described status frame does not terminate the operation at either the channel or the control unit. It only suspends operation. The channel accepts the status frame and causes disconnection using known techniques described in the above noted ESCON reference.

If the control unit cannot suspend the operation as requested by the channel, the control unit terminates the operation by returning a status frame containing unit check status with appropriate sense data.

In addition to the above, an alternative implementation exists for the suspend subchannel CCW when used for the subchannel where the channel program is executing. In particular, instead of being sent as a device-level control frame, the request to suspend is passed to the control unit in a command frame, or as the data argument of a command, in the same manner as ordinary commands are transferred to the control unit, and as an integral part of the ordinary command stream (following the completion of the previous command). The parameter in the count field of the command frame, or the data in the data frame contains the amount of time (in agreed upon units) for which suspension is requested.

Upon acceptance of the suspend command and associated data, the control unit presents channel end indication to the channel and disconnects. The control unit then suspends itself with regard to the channel program, for the duration specified. At the end of the suspension duration, the control unit presents device end. The channel then proceeds to execute the next CCW in the chain, if one exists, or to conclude the execution of the channel program.

It should be noted that the counts and conditions presented at the normal end of an I/O operation are with regard to the whole operation, and ignore the fact that it may have been suspended with the SUSPEND SUBCHANNEL instruction or suspend subchannel CCW, with or without suspend immediate bit turned on.

In addition to the mechanisms described above for suspending execution of an input/output operation, mechanisms are provided, in accordance with the principles of the present invention, for resuming execution of a suspended input/output operation. In particular, both CPU instructions and channel command words are provided which can perform the resume function.

Figure 11:
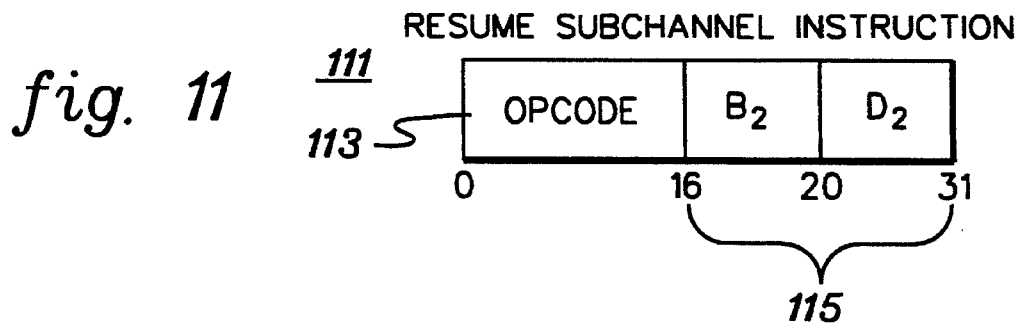
FIG. 11 illustrates one embodiment of a RESUME SUBCHANNEL instruction, in accordance with the principles of the present invention.

In one embodiment, a resume subchannel instruction with limits is provided for resuming execution of an input/output operation or in a specific embodiment, of a suspended channel program. Similar to the SUSPEND SUBCHANNEL instruction described above, a RESUME SUBCHANNEL instruction, provided in accordance with the principles of the present invention, is independent of the I/O operation or the channel program. One example of a RESUME SUBCHANNEL instruction with limits is described with reference to FIG. 11. A RESUME SUBCHANNEL instruction 111 includes an operation code (OPCODE) 113 indicating that a resume operation is to take place, and a second-operand address ($D_2 2(B_2)$) 115 designating a logical address of the operation request block that contains any desired limits.

In one example, each of the limits described above with reference to the START SUBCHANNEL instruction apply to the RESUME SUBCHANNEL instruction. In particular, referring to FIG. 3, the RESUME SUBCHANNEL instruction is capable of resuming execution of the channel program for a particular amount of time (word 3 of the ORB), or until a number of CCWs have been executed (word 4) or until a predefined number of bytes have been transferred between memory and an input/output device (word 5), or until a predefined number of physical blocks of data have been transferred between memory and an input/output device (word 6). As with the START SUBCHANNEL instruction, the channel subsystem will monitor and update counters 26 (FIG. 1a) associated with limits 28 during execution of the channel program. When one or more of the execution limits is met, execution is suspended, once again.

In addition to the RESUME SUBCHANNEL instruction, a resume subchannel channel command word with limits has been created, in accordance with the principles of the present invention. As with the RESUME SUBCHANNEL instruction, the resume subchannel CCW resumes execution of a suspended input/output operation or more specifically, a suspended channel program. In particular, the resume subchannel CCW of the present invention resumes execution of another channel program. That is, a channel program that is not executing the CCW causing the resume function. The subchannel then executes until one or more execution limits is met. The specific limits are located in, for example, an ORB and include the following execution limits, as one example: time, number of CCWs, number of bytes and number of physical blocks (as shown and described with reference to FIG. 3). This ORB, like the ORB described with the suspend CCW, includes the target subchannel number in word 0. The ORB is referenced by a pointer located in, for instance, the data address field of the resume subchannel channel command word.

Figure 12:
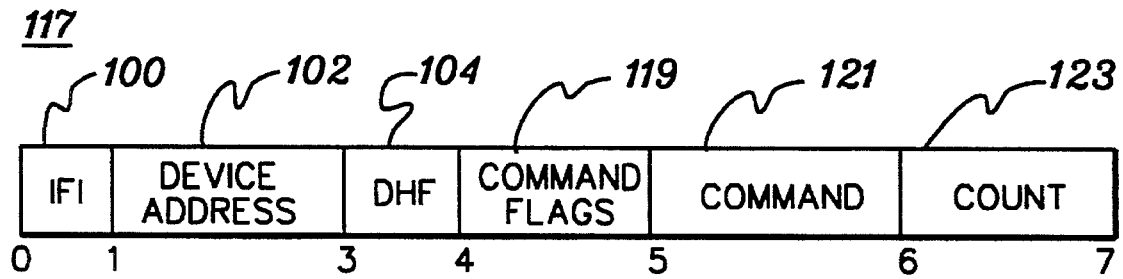
FIG. 12 depicts one embodiment of a command frame, in accordance with the principles of the present invention.

When an I/O operation is resumed at the channel due to, for instance, a RESUME SUBCHANNEL instruction, resume subchannel CCW, or the expiration of a suspension limit, after being suspended by a START SUBCHANNEL instruction, a SUSPEND SUBCHANNEL instruction or suspend CCW with the suspend immediate bit on, the channel resumes the operation at the control unit by sending a command frame to the control unit. One example of a command frame is depicted in FIG. 12. Command frames are described in detail in Enterprise Systems Architecture/ 390 ESCON I/O Interface, Publication No. SA22-7202-02, (International Business Machines Corporation, September 1992), which is hereby incorporated by reference in its entirety. Therefore, only the changes to the command frame, in accordance with the present invention, are described in detail.

In one example, command frame 117 includes the following fields:

Information-field identifier 100, device address 102 and device-header flag field 104, which were described in detail above;

A command flags field 119, which contains chaining flag bits from the current CCW, the data chaining update flag (DU) and the resume update flag (RU). In particular, the command flag field includes:

A chain data (CD) flag: The chain data flag, bit 0, when set to one, specifies an intent to perform chaining of the data. In accordance with the principles of the present invention, the CD flag will contain the same value as the CD flag in the current channel command word;

A chain command (CC) flag: The chain command flag, bit 1, when set to one, while the CD flag is set to zero, specifies an intent to perform chaining of commands. In accordance with the principles of the present invention, the chain command flag will contain the same value as the chain command flag in the current CCW;

A data chaining update (DU) flag: The data chaining update flag, when set to one, indicates that the CC flag, the CD flag and the counts sent in that command frame are associated with the new CCW used during data chaining; and A resume update (RU) flag: In accordance with the principles of the present invention, a new flag referred to as a resume update (RU) flag is stored in bit 7 of the command flag field. This flag, when set to one, indicates that this is a resume update command frame.

A command field 121, which contains the command from the current CCW. The command specifies the I/O operation to be executed.

A count field 123, which specifies a count of data for the current CCW. When the I/O operation is a write operation, the count field contains a number of bytes remaining for the current CCW from the point of suspension. When the I/O operation is a read operation, the count field contains either the number of bytes remaining for the current CCW from the point of suspension (E bit in the device header flag field is set to 1) or the quantity of data the channel wants to initially request from the control unit. The control unit responds to the command frame in a manner known in the art for data chaining command update frames and continues the operation from the point of suspension. (Data chaining command update frame is described in detail in the Enterprise Systems Architecture/390 ESCON I/O Interface Publication No. SA22-7202-02, (International Business Machines Corporation, September 1992), which is hereby incorporated by reference.

As is known in the art, before the information field identifier field 100 is a link header which contains a start of frame delimiter. In accordance with the principles of the present invention, the start of frame delimiter is a connect start of frame delimiter, which is used to initiate the making of a dynamic connection.

Figure 13:
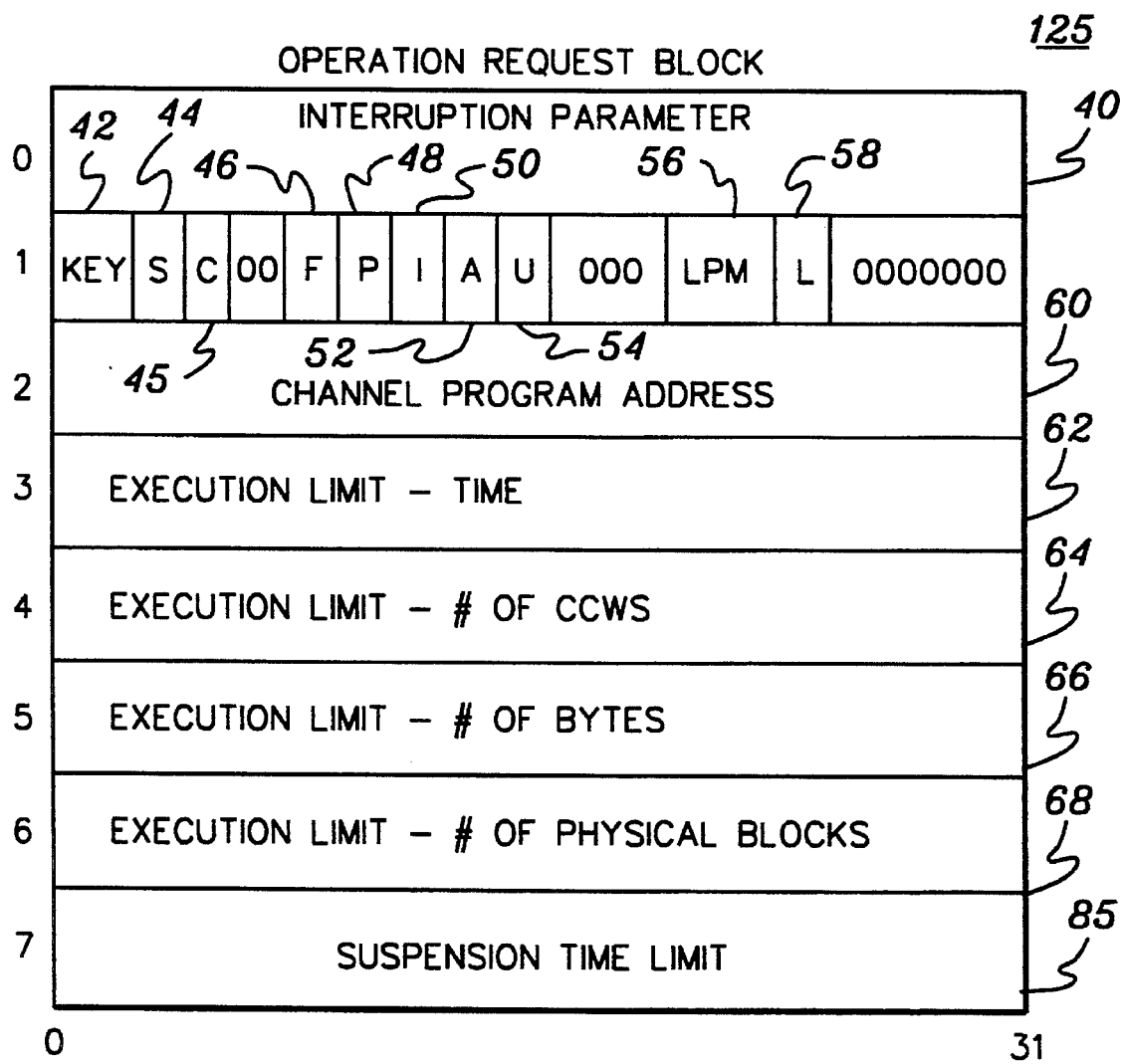
FIG. 13 depicts another embodiment of an operation request block, in accordance with the principles of the present invention.

In another embodiment of the invention, suspension of a subchannel occurs when a specific execution limit is met and the suspension lasts for a predetermined amount of time, after which, an automatic resumption of the suspended subchannel takes place. In accordance with the principles of the present invention, the START SUBCHANNEL instruction is used to begin an operation at the subchannel and, subsequently, suspend a subchannel for a predetermined amount of time when a predefined execution limit is met. The predefined execution limits and the suspension time limit are included in an operation request block 125 depicted in FIG. 13. Each of the words depicted in FIG. 13 have been previously described in detail, as indicated by the like reference numerals. As shown, words 3–6 of operation request block 125 include amount values for the execution limits and word 7 includes an amount value for the suspension time limit.

During execution of the channel program, the channel processor will monitor and update counters 26 (FIG. 1a) in the subchannel associated with the execution limits specified in the ORB (i.e., for example, time, number of channel command words, number of bytes transferred and number of physical blocks transferred), and if a specified limit is exceeded, the channel program will be suspended. The suspension is associated with a maximum sleep time, as designated by the suspension time limit in, for instance, word 7 of the operation request block. At the end of the maximum sleep time, the channel program is automatically resumed by the channel subsystem with a fresh view of the execution limits and the pertinent counters are reset. (It should be noted that if a particular limit is set to zero, that limit is ignored.)

Figure 14:
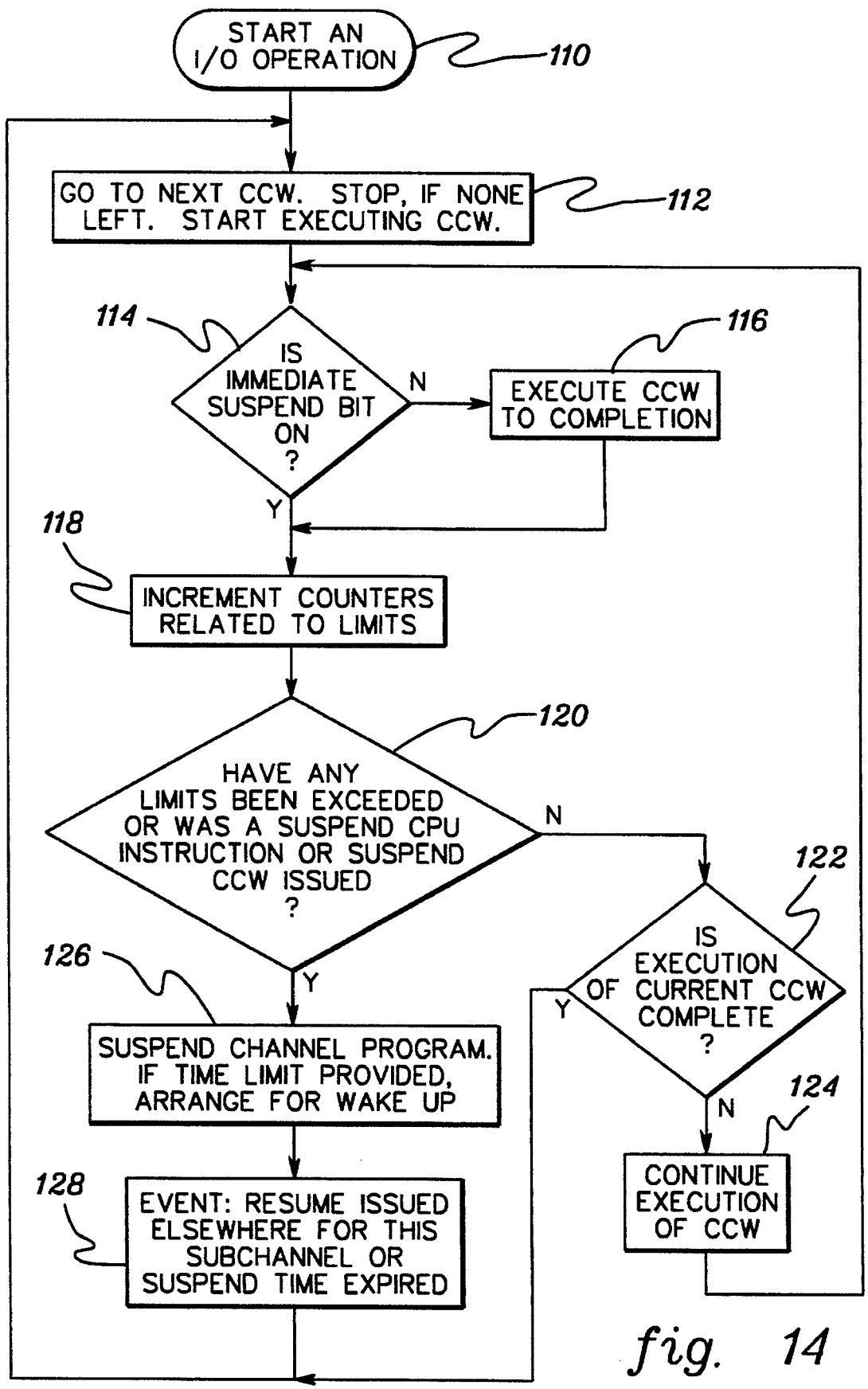
FIG. 14 depicts one example of the logic associated with the processing of suspend and resume mechanisms having limits associated therewith, in accordance with the principles of the present invention.

One embodiment of the logic associated with processing a suspend or resume mechanism having limits associated therewith is described below with reference to FIG. 14. Initially the central processing unit starts an input/output operation via, for instance, the START SUBCHANNEL instruction with limits or a RESUME SUBCHANNEL instruction or resume subchannel CCW with limits, STEP 110 "START AN I/O OPERATION". Thereafter, processing of the next channel command word begins, STEP 112 "GO TO NEXT CCW. STOP, IF NONE LEFT. BEGIN EXECUTING CCW." In particular, if the I/O operation is initiated by a START SUBCHANNEL instruction, then execution of the CCW designated in the ORB begins. This CCW may include a variety of commands, including an existing suspend command. Otherwise, if it is a RESUME SUBCHANNEL instruction or CCW, execution of the currently suspended channel program is resumed. If no further channel command words exist, processing ends.

During execution of the CCW, a determination is made as to whether the immediate suspend bit is on, INQUIRY 114. If it is not on, then the CCW executes to completion, STEP 116. After completing execution of the CCW or if the immediate suspend bit is on, each of counters 26 relating to the execution limits (i.e., for example, time, number of CCWs, number of bytes or number of physical blocks) is incremented by the channel subsystem, STEP 118 "INCREMENT COUNTERS RELATED TO LIMITS". Thereafter, a determination is made as to whether any of the limits have been exceeded or whether a suspend instruction or CCW was issued from another CPU or subchannel, INQUIRY 120.

If no limits have been exceeded and no suspend instruction or CCW was issued, a further determination is made as to whether execution of the current CCW is complete, INQUIRY 122. When execution is complete, processing continues with STEP 112 "GO TO NEXT CCW. STOP, IF NONE LEFT. BEGIN EXECUTING CCW". Otherwise, execution of the CCW is continued, STEP 124, and processing continues with INQUIRY 114.

Returning to INQUIRY 120, if any limits have been exceeded or a suspend CCW or instruction has been issued, the channel program designated by the subchannel number is suspended by the channel subsystem. If a suspension time limit is provided in the operation request block, then automatic wake up is arranged for by the channel subsystem, STEP 126 "SUSPEND CHANNEL PROGRAM. IF TIME LIMIT PROVIDED, ARRANGE FOR WAKE UP."

At some time in the future, either a predefined amount of time specified by the suspension time limit or when a RESUME SUBCHANNEL instruction or CCW is issued by another CPU or subchannel, execution of the channel program is resumed, STEP 128, and processing continues with STEP 112 "GO TO NEXT CCW. STOP, IF NONE LEFT. BEGIN EXECUTING CCW". It should be noted that this resume may resume execution of a channel program suspended by any number of mechanisms, including prior suspend mechanisms and those of the present invention.

Described above are mechanisms for controlling execution of input/output operations, including channel programs. In particular, mechanisms are described which suspend and resume execution of channel programs. For example, a SUSPEND SUBCHANNEL instruction is provided which enables the central processing unit (CPU), and in particular, an I/O supervisor within the CPU, to issue the suspend instruction when, for instance, the I/O supervisor determines the channel program is to be slowed down or there is a system problem. As another example, a suspend subchannel channel command word (CCW) is provided which is used to suspend a subchannel other than the one executing the channel program issuing the suspend for coordinating execution of multiple data transfers. Further, a suspend subchannel instruction with a time limit and a suspend subchannel channel command word with a time limit are provided which allow the slowing down of a channel program or the coordination with other channel programs. Additionally, in accordance with the principles of the present invention, limits have been added to a START SUBCHANNEL instruction, a RESUME SUBCHANNEL instruction and a resume subchannel channel command word such that automatic suspension and/or resumption is possible. Further, a start/resume subchannel instruction with both execution limits for determining when a suspend is to take place and a suspension time limit for determining when resumption is to occur is provided.

As described above, a number of the resume and suspend instructions and CCWs of the present invention reference execution and suspension limits. When a particular limit is met, appropriate action is taken. In accordance with the principles of the present invention, these limits may be modified during execution of the I/O operations. In one example, a MODIFY SUBCHANNEL instruction may be used to modify one or more of the limits stored in the subchannel. One example of a MODIFY SUBCHANNEL instruction is described in detail in Enterprise Systems Architecture/390 Principles of Operation, Publication Number SA22-7201-01 (IBM Corporation, April 1993), which is hereby incorporated by reference in its entirety, as noted above.

The MODIFY SUBCHANNEL instruction has been modified, in accordance with the principles of the present invention. In particular, the MODIFY SUBCHANNEL instruction is not rejected when the subchannel is status pending or has some function in progress, if the only fields being changed by the MODIFY SUBCHANNEL instruction are limits 28.

As an alternative to using the MODIFY SUBCHANNEL instruction, a new instruction or a new command of the existing CHSC (channel subsystem call) instruction, referred to as an update subchannel instruction, is used to modify the limits stored in the subchannel.

In addition to the above, mechanisms are provided in accordance with the principles of the present invention to enhance the known measurement block, which accumulates performance information for subchannels. The measurement block is described in detail in Enterprise Systems Architecture/390 Principles of Operation, Publication No. SA22-7201-01 (International Business Machines Corporation, April 1993), which has been incorporated by reference in its entirety herein. In particular, in accordance with the principles of the present invention, a total suspend time count has been added to word 4 of the measurement block and a total suspend time in the middle of I/O operations has been added to word 5.

The above embodiments are described using the ESA/390 architecture. However, it will be apparent to one of ordinary skill in the art, how to apply the techniques described herein to individual commands or queries of other architectures. These are therefore considered within the scope of the invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for providing control within a data processing system, said data processing system comprising one or more central processing units, one or more input/output devices and a memory coupled to said one or more central processing units and said one or more input/output devices, said method comprising:

executing one or more input/output operations within said data processing system;

suspending execution of said one or more input/output operations by executing a suspend operation, said suspend operation executing independently of said one or more input/output operations, resuming said execution of said one or more input/output operations, and suspending said execution of said one or more input/output operations which has been resumed when a predefined number of channel command words has been processed.

2. A method for providing control within a data processing system, said method comprising:

initiating execution of one or more input/output operations using an instruction controlled by a central processing unit of said data processing system;

suspending execution of said one or more input/output operations using said instruction, and said execution of said one or more input/output operations is suspended when a predefined number of channel command words has been processed.

3. A method for providing control within a data processing system, said method comprising:

initiating execution of one or more input/output operations using an instruction controlled by a central processing unit of said data processing system;

suspending execution of said one or more input/output operations using said instruction, and storing one or more limits to be used in suspending execution of said one or more input/output operations within a subchannel of said data processing system, and modifying said one or more limits stored within said subchannel.

4. A method for providing control within a data processing system, said method comprising:

initiating execution of a plurality of input/output operations using an instruction controlled by a central processing unit of said data processing system;

using one or more of execution limits to determine when said execution of said one or more input/output operations is to be suspended;

suspending said execution of said one or input/output operations using said instructions when said one or more execution limits determines said execution is to be suspended;

automatically resuming said execution of said one or more input/output operations when a predefined suspension limit is satisfied;

each of said one or more input/output operations comprises one or more channel command words, and said one or more execution limits comprises a limit based on a predefined number of channel command words being processed.

5. A method for providing control within a data processing system, said method comprising:

resuming execution of one or more input/output operations that has been suspended, said resuming referencing one or more predefined execution limits; and suspending said execution of said one or more input/output operations that has been resumed when said one or more predefined execution limits has been satisfied, and predefining said one or more predefined execution limits by a command limit based on a predefined number of channel command words to be processed.

6. A system for providing control within a data processing system, said data processing system comprising one or more central processing units, one or more input/output devices and a memory coupled to said one or more central processing units and said one or more input/output devices, said system comprising:

means for executing one or more input/output operations within said data processing system;

means for suspending execution of said one or more input/output operations by executing a suspend operation, said suspend operation executing independently of said one or more input/output operations;

means for resuming said execution of said one or more input/output operations; and means for suspending said execution of said one or more input/output operations which has been resumed when a predefined number of channel command words has been processed.

7. A system for providing control within a data processing system, said system comprising:

means for initiating execution of one or more input/output operations using an instruction controlled by a central processing unit of said data processing system;

means for suspending execution of said one or more input/output operations using said instruction; and each of said one or more input/output operations comprises one or more channel command words, and wherein said execution of said one or more input/output operations is suspended by said means for suspending when a predefined number of channel command words has been processed.

8. A system for providing control within a data processing system, said system comprising:

means for initiating execution of one or more input/output operations using an instruction controlled by a central processing unit of said data processing system;

means for suspending execution of said one or more input/output operations using said instruction; and said means for initiating further comprises means for storing one or more limits to be used in suspending execution of said one or more input/output operations within a subchannel of said data processing system; and means for modifying said one or more limits stored within said subchannel.

9. A system for providing control within a data processing system, said system comprising:

means for initiating execution of one or more input/output operations using an instruction controlled by a central processing unit of said data processing system;

means for using one or more execution limits to determine when said execution of said one or more input/output operations is to be suspended;

means for suspending said execution of said one or more input/output operations using said instruction when said one or more execution limits determines said execution is to be suspended;

means for automatically resuming said execution of said one or more input/output operations when a predefined suspension limit is satisfied; and each of said one or more input/output operations comprises one or more channel command words, and said one or more execution limits comprises a limit based on a predefined number of channel command words being processed.

10. A system for providing control within a data processing system, said system comprising:

means for resuming execution of one or more input/output operations that has been suspended, said means for resuming referencing one or more predefined execution limits;

means for suspending said execution of said one or more input/output operations that has been resumed when said one or more predefined execution limits has been satisfied; and each of said one or more input/output operations comprises one or more channel command words, and said one or more predefined execution limits comprises a command limit based on a predefined number of channel command words to be processed.

11. A method for using predetermined conditions to control suspension and resumption of execution of an I/O program by an I/O subsystem (IOSS) in a data processing system, said method comprising:

issuing an instruction by a central processing unit (CPU) in said data processing system for requesting execution of an I/O program by the IOSS, the CPU instruction having an operand for locating an operation request control block (ORB) containing fields for storing at least one suspension parameter and at least one resumption parameter for respectively controlling suspension and resumption of execution by the I/O program, the suspension parameter being predefined as a number of processing measurable units for the I/O program, and the resumption parameter being predefined as a number of suspension measurable units for the I/O program;

executing the CPU instruction by copying the suspension parameter and the resumption parameter from the ORB into an I/O subchannel selected for use by the I/O program;

starting execution of the I/O program by the IOSS;

counting by the IOSS processing measurable units during execution of said I/O program from a starting, or a last resumption, of execution by the I/O program;

suspending execution of said I/O program when a count by the counting step of the processing measurable units equals or exceeds the suspension parameter copied into the subchannel;

starting a count of suspension measurable units for the I/O program when execution is suspended for the I/O program;

resuming execution of the I/O program when the count of suspension measurable units equals or exceeds the number of suspension measurable units in the resumption parameter copied into the subchannel, and controlling by the IOSS any number of suspensions and resumptions of execution by the I/O program without IOSS requests to a CPU to control the suspensions and resumptions.

12. A method for controlling suspension and resumption of execution by an I/O program in an IOSS of a data processing system as defined in claim 11, said method further comprising:

storing a channel-control-word (CCW) value as the suspension parameter in the ORB for controlling the suspensions of execution by the I/O program.

13. A method for controlling suspension and resumption of execution by an I/O program in an IOSS of a data processing system as defined in claim 11, said method further comprising:

storing a time value into a field in the ORB as the suspension parameter for controlling the suspensions of execution by the I/O program.

14. A method for controlling suspension and resumption of execution by an I/O program in an IOSS of a data processing system as defined in claim 11, said method further comprising:

storing a byte value into the ORB as the suspension parameter for controlling the suspensions of execution by the I/O program.

15. A method for controlling suspension and resumption of execution by an I/O program in a data processing system as defined in claim 11, said method further comprising:

storing a physical-block-transfer value into the ORB as the I/O suspension parameter to indicate the number of physical blocks to be transferred by the I/O program between an I/O device and a memory of the data processing system for controlling the occurrence of each next suspension of execution by the I/O program.

16. A method for controlling suspension and resumption of execution by an I/O program in an IOSS of a data processing system as defined in claim 11, said method further comprising:

storing a time value in the ORB as the resumption parameter for controlling each next resumption of execution from each last suspension of execution by the I/O program.

* * * * *